US012073756B2

(12) United States Patent
Park et al.

(10) Patent No.: US 12,073,756 B2
(45) Date of Patent: Aug. 27, 2024

(54) METHOD OF COMPENSATING FOR LUMINANCE OF DISPLAY DEVICE

(71) Applicant: Samsung Display Co., Ltd., Yongin-Si (KR)

(72) Inventors: Sungjae Park, Seongnam-si (KR); Seunghwan Park, Anyang-si (KR); Jinho Lee, Hwaseong-si (KR); Namjae Lim, Yongin-si (KR); Kyung-Sik Joo, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/102,803

(22) Filed: Jan. 30, 2023

(65) Prior Publication Data

US 2023/0252929 A1 Aug. 10, 2023

(30) Foreign Application Priority Data

Feb. 4, 2022 (KR) ........................ 10-2022-0015046

(51) Int. Cl.
*G09G 3/20* (2006.01)

(52) U.S. Cl.
CPC ... *G09G 3/2007* (2013.01); *G09G 2320/0233* (2013.01); *G09G 2320/0673* (2013.01); *G09G 2320/0686* (2013.01); *G09G 2340/0435* (2013.01); *G09G 2360/145* (2013.01)

(58) Field of Classification Search
CPC ... G09G 2320/0233; G09G 2320/0673; G09G 2320/0686; G09G 2340/0435; G09G 2360/145; G09G 3/20; G09G 3/2007
See application file for complete search history.

(56) References Cited

U.S. PATENT DOCUMENTS

| | | | | |
|---|---|---|---|---|
| 9,318,069 | B2 | 4/2016 | Nambi et al. | |
| 9,501,993 | B2 | 11/2016 | Nambi et al. | |
| 2014/0340431 | A1* | 11/2014 | Yamakawa | G09G 3/2003 345/690 |
| 2018/0350313 | A1* | 12/2018 | Nambi | G09G 3/36 |
| 2019/0066555 | A1* | 2/2019 | Gu | G09G 3/006 |
| 2019/0180695 | A1* | 6/2019 | Ha | G09G 3/2051 |

(Continued)

FOREIGN PATENT DOCUMENTS

| | | |
|---|---|---|
| KR | 10-1651291 B1 | 8/2016 |
| KR | 10-1774127 B1 | 9/2017 |

(Continued)

*Primary Examiner* — Kenneth Bukowski

(74) *Attorney, Agent, or Firm* — Innovation Counsel LLP

(57) ABSTRACT

A method of compensating for luminance of a display device includes determining position compensation values of each of panel blocks for measurement grayscale values based on a difference between luminance of a reference panel block and luminance of the each of the panel blocks for the measurement grayscale values, generating a first gamma curve for a first driving frequency and the position compensation values of the each of the panel blocks for the measurement grayscale values, generating a second gamma curve for a second driving frequency and the luminance of the panel blocks for the measurement grayscale values at the first driving frequency, and compensating for input image data based on the first gamma curve and the second gamma curve.

20 Claims, 8 Drawing Sheets

(56) References Cited

U.S. PATENT DOCUMENTS

| | | | | |
|---|---|---|---|---|
| 2020/0005723 | A1* | 1/2020 | Kim | G09G 3/3696 |
| 2020/0152111 | A1* | 5/2020 | Lim | G09G 3/3648 |
| 2021/0035514 | A1* | 2/2021 | Cho | G09G 3/3607 |
| 2021/0201823 | A1* | 7/2021 | Han | G09G 3/3275 |
| 2022/0238076 | A1* | 7/2022 | Bae | G09G 3/3233 |
| 2023/0005408 | A1* | 1/2023 | Lee | G09G 3/2007 |
| 2023/0143803 | A1* | 5/2023 | Lee | G09G 3/20 345/690 |

FOREIGN PATENT DOCUMENTS

| | | | |
|---|---|---|---|
| KR | 10-2019-0021761 | A | 3/2019 |
| KR | 10-2019-0069667 | A | 6/2019 |
| KR | 10-2020-0053365 | A | 5/2020 |

* cited by examiner

FR1
MP3

| | | | | |
|---|---|---|---|---|
| 39 | 11 | 10 | 12 | 36 |
| 18 | 2 | 1 | 6 | 27 |
| 16 | 3 | 12 | 8 | 24 |
| 21 | 7 | 5 | 9 | 40 |
| 30 | 13 | 14 | 15 | 33 |

FR2
MP4

| | | | | |
|---|---|---|---|---|
| 39 | 11 | 10 | 12 | 36 |
| 18 | 2 | 1 | 6 | 27 |
| 16 | 3 | 12 | 8 | 24 |
| 21 | 7 | 5 | 9 | 40 |
| 30 | 13 | 14 | 15 | 33 |

FIG. 7

MP1

| | | | | |
|---|---|---|---|---|
| 40 | 40 | 40 | 40 | 40 |
| 40 | 12 | 12 | 12 | 40 |
| 40 | 12 | 40 | 12 | 40 |
| 40 | 12 | 12 | 12 | 40 |
| 40 | 40 | 40 | 40 | 40 |

MP2

| | | | | |
|---|---|---|---|---|
| 12 | 12 | 12 | 12 | 12 |
| 12 | 4 | 4 | 4 | 12 |
| 12 | 4 | 4 | 4 | 12 |
| 12 | 4 | 4 | 4 | 12 |
| 12 | 12 | 12 | 12 | 12 |

MP3

| | | | | |
|---|---|---|---|---|
| 39 | 11 | 10 | 12 | 36 |
| 18 | 2 | 1 | 6 | 27 |
| 16 | 3 | 12 | 8 | 24 |
| 21 | 7 | 5 | 9 | 40 |
| 30 | 13 | 14 | 15 | 33 |

G1:12
G2:4
G3:40

METHOD OF COMPENSATING FOR LUMINANCE OF DISPLAY DEVICE

PRIORITY STATEMENT

This application claims priority under 35 U.S.C. § 119 to Korean Patent Application No. 10-2022-0015046, filed on Feb. 4, 2022, in the Korean Intellectual Property Office KIPO, the contents of which are herein incorporated by reference in their entireties.

BACKGROUND

1. Field

Embodiments of the present inventive concept relate to a method of compensating for luminance of a display device. More particularly, embodiments of the present inventive concept relate to a method of compensating for luminance of a display device that support variable frame mode.

2. Description of the Related Art

Generally, a display device may display an image with a constant driving frequency of 60 Hz or higher. However, a rendering frequency of rendering by a host processor (e.g., a graphic processing unit (GPU), etc.) that provides input image data to the display device may not match the driving frequency of the display device. A tearing phenomenon in which a boundary line is generated in the image displayed on the display device may occur due to frequency mismatch.

To prevent such a tearing phenomenon, a variable frame mode in which the rendering frequency of the host processor and the driving frequency of the display device are synchronized (e.g., Free-Sync mode, G-Sync mode, etc.) has been developed.

However, in the display device operating in the variable frame mode, luminance of the display panel may not be uniform at different driving frequencies.

SUMMARY

Embodiments of the present inventive concept provide a method of compensating for a display device generating gamma curves for driving frequencies.

According to embodiments of the present inventive concept, a method of compensating for luminance of a display device may include determining position compensation values of each of panel blocks for measurement grayscale values based on a difference between luminance of a reference panel block and luminance of the each of the panel blocks for the measurement grayscale values, generating a first gamma curve for a first driving frequency based on luminance of the panel blocks for the measurement grayscale values at the first driving frequency and the position compensation values of the each of the panel blocks for the measurement grayscale values, generating a second gamma curve for a second driving frequency different from the first driving frequency based on a difference between luminance of the panel blocks for the measurement grayscale values at the second driving frequency and the luminance of the panel blocks for the measurement grayscale values at the first driving frequency, and compensating for input image data based on the first gamma curve and the second gamma curve.

In an embodiment, determining the position compensation values of the each of the panel blocks may include determining a first position compensation value of each of the panel blocks for a first measurement grayscale value based on a difference between luminance of the reference panel block for the first measurement grayscale value and luminance of the each of the panel blocks for the first measurement grayscale value, determining a second position compensation value of each of the panel blocks for the second measurement grayscale value based on a difference between luminance of the reference panel block for the second measurement grayscale value and luminance of the each of the panel blocks for the second measurement grayscale value, and determining the position compensation value of each of the panel blocks for other measurement grayscale values other than the first measurement grayscale value and the second measurement grayscale value among the measurement grayscale values based on the first position compensation value and the second position compensation value.

In an embodiment, the position compensation value of each of the panel blocks for the other measurement grayscale values may be determined by using $$LC = C \times \left(\frac{G - G2}{G1 - G2}\right)^{u} \times (LC1 - LC2) + LC2,$$

where LC is the position compensation value of the each of the panel blocks for the other measurement grayscale values, C is a first characteristic coefficient, G is the other measurement grayscale values, G1 is the first measurement grayscale value, G2 is the second measurement grayscale value, u is a second characteristic coefficient, LC1 is the first position compensation value, and LC2 is the second position compensation value.

In an embodiment, the determining the position compensation value of the each of the panel blocks may include determining a third position compensation value of each of first panel blocks for a first measurement grayscale value based on a difference between luminance of the reference panel block for the first measurement grayscale value and luminance of the each of the first panel blocks for the first measurement grayscale value, determining a fourth position compensation value of each of second panel blocks for the first measurement grayscale value based on a difference between the luminance of the reference panel block for the first measurement grayscale value and luminance of the each of the second panel blocks for the first measurement grayscale value, determining a fifth position compensation value of each of the first panel blocks for a second measurement grayscale value based on a difference between luminance of the reference panel block for the second measurement grayscale value and luminance of the each of the first panel blocks for the second measurement grayscale value, determining a sixth position compensation value of each of the second panel blocks for third measurement grayscale value based on a difference between luminance of the reference panel block for the third measurement grayscale value and luminance of the each of the second panel blocks for the third measurement grayscale value, determining position compensation values of each of the first panel blocks for first other measurement grayscale values other than the first measurement grayscale value and the second measurement grayscale value among the measurement grayscale values based on the third position compensation value and the fifth position compensation value, and determining position compensation values of each of the second panel blocks for second other measurement grayscale values other than the first measurement grayscale value and the third measurement grayscale value among the measurement grayscale values based on the fourth position compensation value and the sixth position compensation value.

In an embodiment, the position compensation value of the each of the first panel blocks for the first other measurement grayscale values may be determined by using $$LCA = C \times \left(\frac{G - G2}{G1 - G2}\right)^{u} \times (LC3 - LC5) + LC5,$$

where LCA is the position compensation value of the each of the first panel blocks for the first other measurement grayscale values, C is a first characteristic coefficient, G is the first other measurement grayscale values, G1 is the first measurement grayscale value, G2 is the second measurement grayscale, u is a second characteristic coefficient, LC3 is the third position compensation value, and LC5 is the fifth position compensation value. The position compensation value of the each of the second panel blocks for the second other measurement grayscale values may be determined by using $$LCB = C \times \left(\frac{G - G1}{G3 - G1}\right)^{u} \times (LC5 - LC4) + LC4,$$

where LCB is the position compensation value of the each of the second panel blocks for the second other measurement grayscale values, C is the first characteristic coefficient, G is the second other measurement grayscale values, G1 is the first measurement grayscale value, G3 is the third measurement grayscale value, u is the second characteristic coefficient, LC6 is the sixth position compensation value, and LC4 is the fourth position compensation value.

In an embodiment, the first characteristic coefficient and the second characteristic coefficient may be calculated through artificial intelligence learning.

In an embodiment, determining the position compensation value of the each of the panel blocks may include displaying the third measurement grayscale value to the reference panel block, the first measurement grayscale value to the first panel blocks, and the third measurement grayscale value to the second panel blocks in a first measurement period of the first driving frequency, displaying the second measurement grayscale value to the first panel blocks, and the first measurement grayscale value to the second panel blocks in a second measurement period of the first driving frequency, and displaying the first measurement grayscale value to the reference panel block and the different measurement grayscale values to the first panel blocks and the second panel blocks in a third measurement period of the first driving frequency.

In an embodiment, the first gamma curve may be generated by adding the position compensation value of each of the panel blocks for the measurement grayscale values to luminance of the panel blocks for the measurement grayscale values measured in the third measurement period.

In an embodiment, generating the second gamma curve may include displaying the measurement grayscale values to the panel blocks in a same manner as in the third measurement period, in a fourth measurement period of the second driving frequency, and generating the second gamma curve by adding the position compensation value of each of the panel blocks for the measurement grayscale values to luminance of the panel blocks for the measurement grayscale values measured in the fourth measurement period.

In an embodiment, the first measurement grayscale may be greater than the second measurement grayscale and is smaller than the third measurement grayscale, the first panel blocks may be disposed to surround the reference panel blocks, and the second panel blocks may be disposed to surround the first panel blocks.

In an embodiment, the measurement grayscale values displayed on the first panel blocks may be smaller than the measurement gray scale values displayed on the second panel blocks in the third measurement period.

In an embodiment, the compensating for the input image data may include generating gamma curves for frequencies other than the first driving frequency and the second driving frequency based on the first gamma curve and the second gamma curve, and compensating for the input image data by a difference between the first gamma curve and gamma curves other than the first gamma curve.

In an embodiment, the first driving frequency may be greater than the second driving frequency.

According to embodiments, a method of compensating for luminance of a display device may include determining position compensation values of each of panel blocks for measurement grayscale values based on a difference between luminance of a reference panel block and luminance of the each of the panel blocks for the measurement gray scale values, generating a first gamma curve for a first driving frequency based on luminance of the panel blocks for the measurement grayscale values at the first driving frequency and the position compensation values of the each of the panel blocks for the measurement grayscale values, generating a second gamma curve for a second driving frequency different from the first driving frequency based on a difference between luminance of the panel blocks for the measurement grayscale values at the second driving frequency and the luminance of the panel blocks for the measurement grayscale values at the first driving frequency, generating a third gamma curve for a third driving frequency different from the first driving frequency and the second driving frequency based on a difference between luminance of the panel blocks for the measurement grayscale values at the third driving frequency and the luminance of the panel blocks for the measurement grayscale values at the first driving frequency, and compensating for input image data based on the first gamma curve, the second gamma curve, and the third gamma curve.

In an embodiment, the determining the position compensation values of the each of the panel blocks may include determining a third position compensation value of each of first panel blocks for a first measurement grayscale value based on a difference between luminance of the reference panel block for the first measurement grayscale value and luminance of the each of the first panel blocks for the first measurement grayscale value, determining a fourth position compensation value of each of second panel blocks for the first measurement grayscale value based on a difference between the luminance of the reference panel block for the first measurement grayscale value and luminance of the each of the second panel blocks for the first measurement grayscale value, determining a fifth position compensation value of each of the first panel blocks for a second measurement grayscale value based on a difference between luminance of the reference panel block for the second measurement grayscale value and luminance of the each of the first panel blocks for the second measurement grayscale value, determining a sixth position compensation value of each of the second panel blocks for a third measurement grayscale value based on a difference between luminance of the reference panel block for the third measurement grayscale value and luminance of the each of the second panel blocks for the third measurement grayscale value, determining position compensation values of each of the first panel blocks for first other measurement grayscale values other than the first measurement grayscale value and the second measurement grayscale value among the measurement grayscale values based on the third position compensation value and the fifth position compensation value, and determining position compensation values of each of the second panel blocks for second other measurement grayscale values other than the first measurement grayscale value and the third measurement grayscale value among the measurement grayscale values based on the fourth position compensation value and the sixth position compensation value.

In an embodiment, the determining the position compensation values of each of the panel blocks may include displaying the third measurement grayscale value to the reference panel block, the first measurement grayscale value to the first panel blocks, and the third measurement grayscale value to the second panel blocks in a first measurement period of the first driving frequency, displaying the second measurement grayscale value to the first panel blocks and the first measurement grayscale value to the second panel blocks in a second measurement period of the first driving frequency, and displaying the first measurement grayscale value to the reference panel block and the different measurement grayscale values to the first panel blocks and the second panel blocks, in a third measurement period of the first driving frequency.

In an embodiment, the first gamma curve may be generated by adding the position compensation values of each of the panel blocks for the measurement grayscale values to luminance of the panel blocks for the measurement grayscale values measured in the third measurement period.

In an embodiment, the generating the second gamma curve may include displaying the same measurement grayscale values as the third measurement period to the panel blocks in a fourth measurement period of the second driving frequency, and generating the second gamma curve by adding the position compensation values of each of the panel blocks for the measurement grayscale values to luminance of the panel blocks for the measurement grayscale values measured in the fourth measurement period. The generating the third gamma curve may include displaying the same measurement grayscale values as the third measurement period to the panel blocks in a fifth measurement period of the third driving frequency, and generating the third gamma curve by adding the position compensation values of each of the panel blocks for the measurement grayscale values to luminance of the panel blocks for the measurement grayscale values measured in the fifth measurement period.

In an embodiment, the compensating for the input image data may include generating gamma curves for frequencies other than the first driving frequency, the second driving frequency, and the third driving frequency based on the first gamma curve, the second gamma curve, and the third gamma curve, and compensating for the input image data by a difference between the first gamma curve and gamma curves other than the first gamma curve.

In an embodiment, the first driving frequency may be greater than the second driving frequency and the third driving frequency.

Therefore, the method may generate gamma curves for driving frequencies by determining position compensation values of each of panel blocks for measurement grayscale values based on a difference between luminance of a reference panel block and luminance of the each of the panel blocks for the measurement grayscale values, generating a first gamma curve for a first driving frequency based on luminance of the panel blocks for the measurement grayscale values at the first driving frequency and the position compensation values of the each of the panel blocks for the measurement grayscale values, generating a second gamma curve for a second driving frequency different from the first driving frequency based on a difference between luminance of the panel blocks for the measurement grayscale values at the second driving frequency and the luminance of the panel blocks for the measurement grayscale values at the first driving frequency, and compensating for input image data based on the first gamma curve and the second gamma curve. Accordingly, the display device may compensate for a difference in luminance according to the driving frequency.

In addition, the method may more accurately compensate for a difference in luminance according to a driving frequency than when compensating for input image data only based on a first gamma curve and a second gamma curve by generating a third gamma curve for a third driving frequency different from the first driving frequency and the second driving frequency based on a difference between luminance of the panel blocks for the measurement grayscale values at the third driving frequency and the luminance of the panel blocks for the measurement grayscale values at the first driving frequency.

However, the effects of the present inventive concept are not limited to the above-described effects, and may be variously expanded without departing from the spirit and scope of the present inventive concept.

BRIEF DESCRIPTION OF THE DRAWINGS

FIG. 7 is a conceptual diagram illustrating an example in which a position compensation value is determined according to a method of compensating for luminance of a display device according to embodiments of the present inventive concept.

DETAILED DESCRIPTION OF THE INVENTIVE CONCEPT

Hereinafter, the present inventive concept will be explained in detail with reference to the accompanying drawings.

Figure 1:
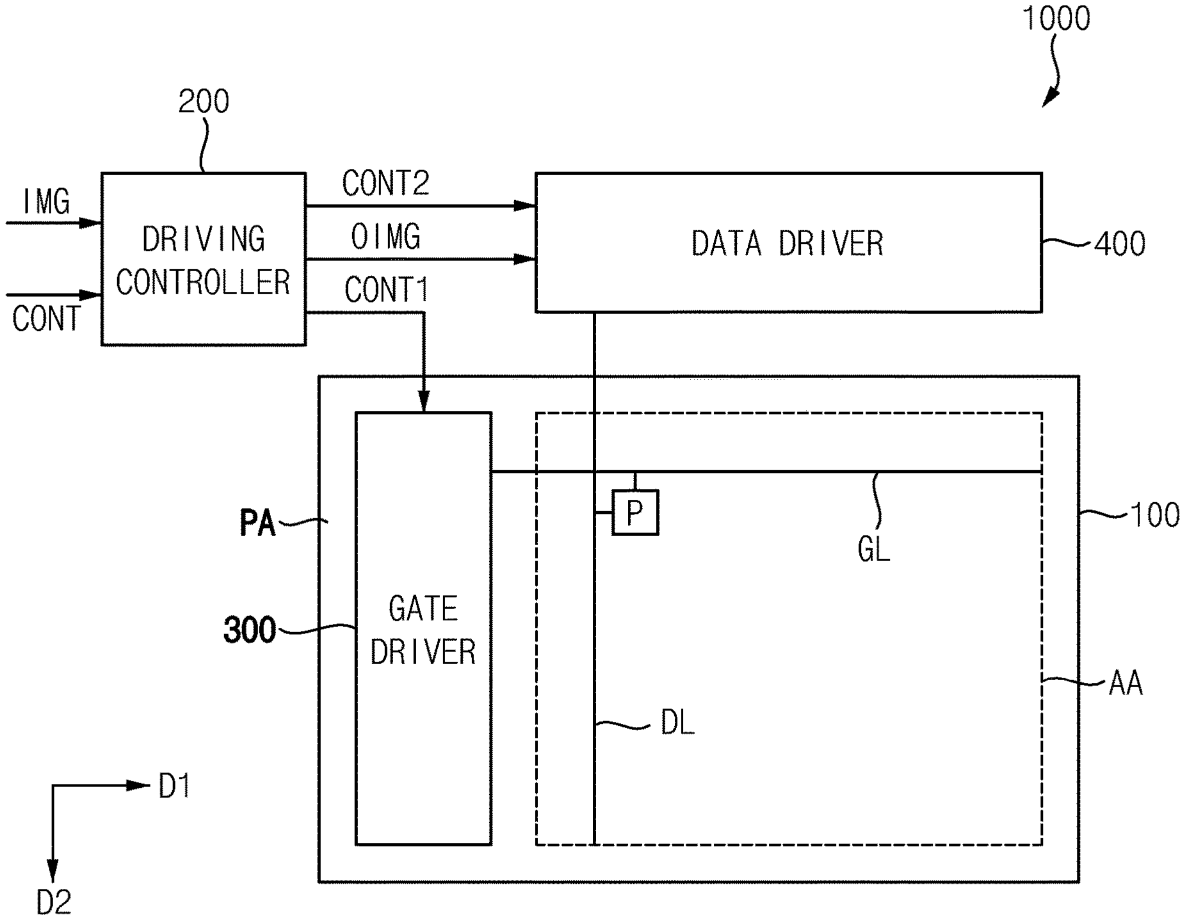
FIG. 1 is a block diagram illustrating a display device according to embodiments of the present inventive concept.

FIG. 1 is a block diagram illustrating a display device 1000 according to embodiments of the present inventive concept.

Referring to FIG. 1, the display device 1000 may include a display panel 100, a driving controller 200, a gate driver 300, and a data driver 400. In an embodiment, the driving controller 200 and the data driver 400 may be integrated into one chip.

The display panel 100 has a display region AA on which an image is displayed and a peripheral region PA disposed adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

Figure 2:
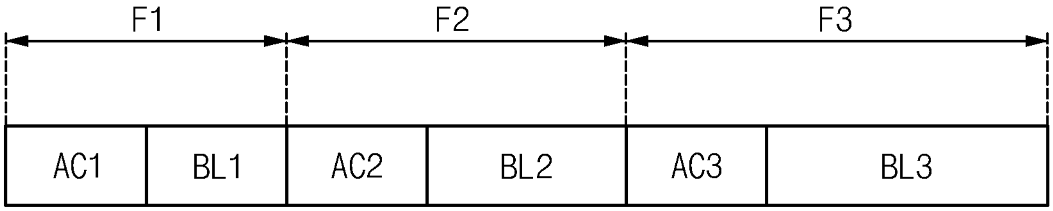
FIG. 2 is a conceptual diagram illustrating a driving frequency of a display panel of the display device of FIG. 1.

FIG. 2 is a conceptual diagram illustrating a driving frequency of the display panel 100 of the display device 1000 of FIG. 1.

Referring to FIGS. 1 and 2, the display panel 100 may be driven with a variable driving frequency (i.e., operated in a variable frame mode). The first frame F1 having the first driving frequency may include a first active period AC1 and a first blank period BL1.

The second frame F2 having a second driving frequency different from the first driving frequency may include a second active period AC2 and a second blank period BL2. The third frame F3 having a third driving frequency different from the first driving frequency and the second driving frequency may include a third active period AC3 and a third blank period BL3.

The first active period AC1 may have the same length as the second active period AC2, and the first blank period BL1 may have a different length from the second active period BL2 and the third active period.

The second active period AC2 may have the same length as the third active period AC3, and the second blank period BL2 may have a different length from the first active period and the third active period BL3.

A display device supporting the variable frame mode may include a data writing period in which the data voltages are written to the pixels P and a self-scan period in which only light emission is performed without writing the data voltages to the pixels P. The data writing period may be arranged in the active periods AC1, AC2, and AC3. The self-scan period may be arranged in the blank periods BL1, BL2, and BL3.

Figure 3:
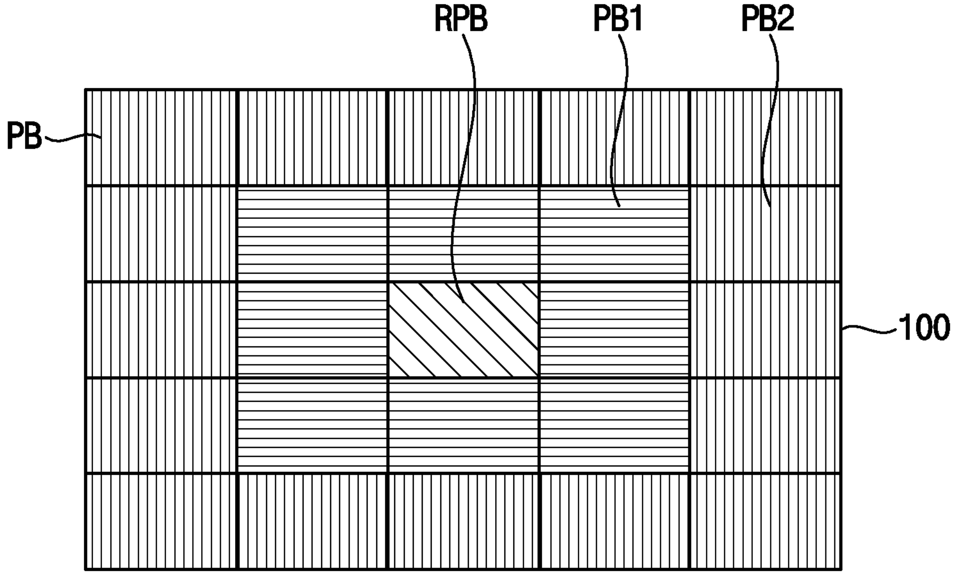
FIG. 3 is a diagram illustrating a display panel of the display device of FIG. 1.

FIG. 3 is a diagram illustrating the display panel 100 of the display device 1000 of FIG. 1.

Referring to FIG. 3, The display panel 100 may be divided into panel blocks PB. The panel blocks PB may include a reference panel block RPB, first panel blocks PB1, and second panel blocks PB2. The first panel blocks PB1 may be disposed outside the reference panel block RPB in the display panel 100. The second panel blocks PB2 may be disposed outside the first panel blocks PB1 in the display panel 100. For example, the reference panel block RPB may be disposed in a center of the display panel 100, the first panel blocks PB1 may surround the reference panel block RPB, and the second panel blocks PB2 may surround the first panel blocks PB1.

Figure 4:
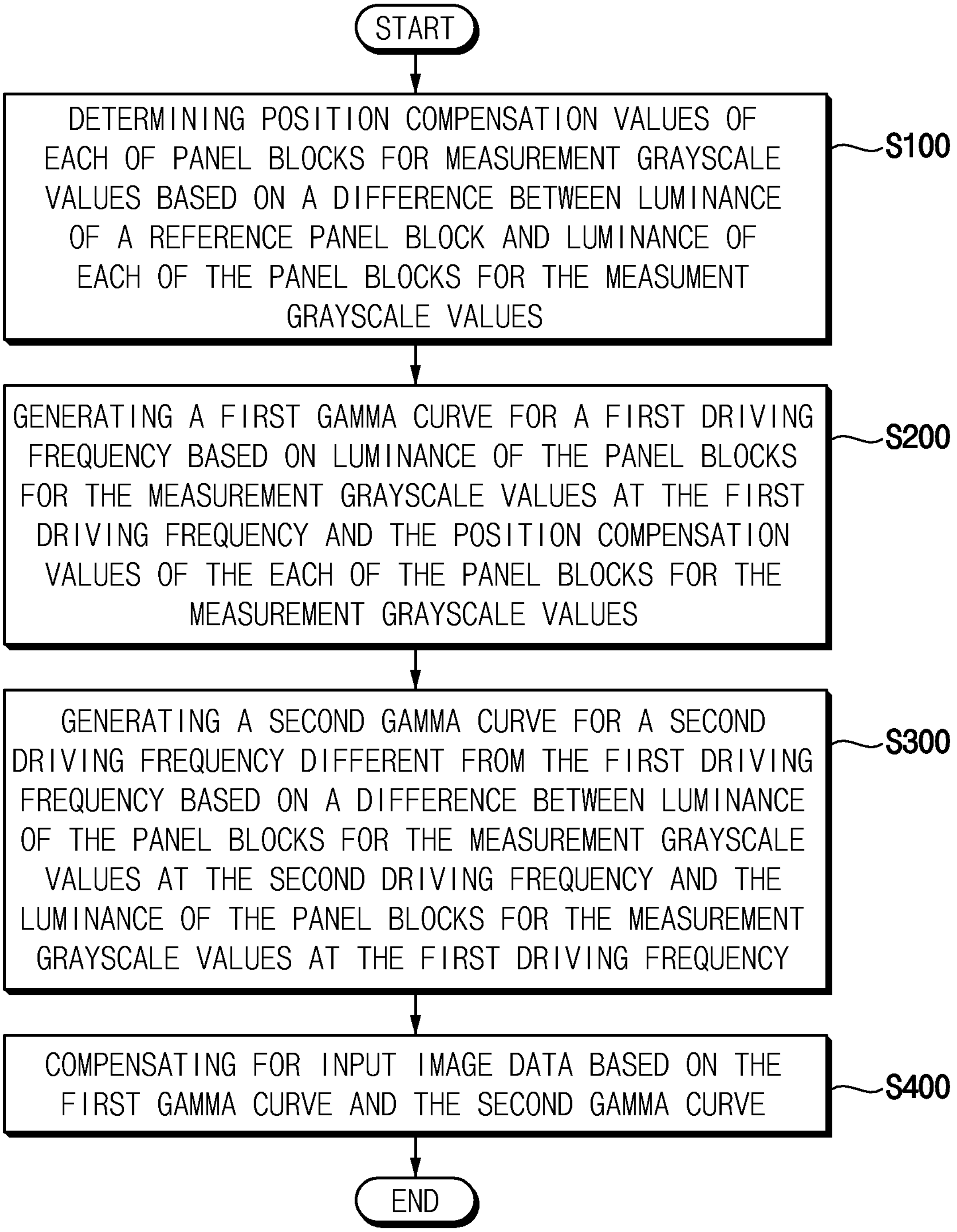
FIG. 4 is a flowchart illustrating a method of compensating for luminance of a display device according to embodiments of the present inventive concept.
Figure 5:
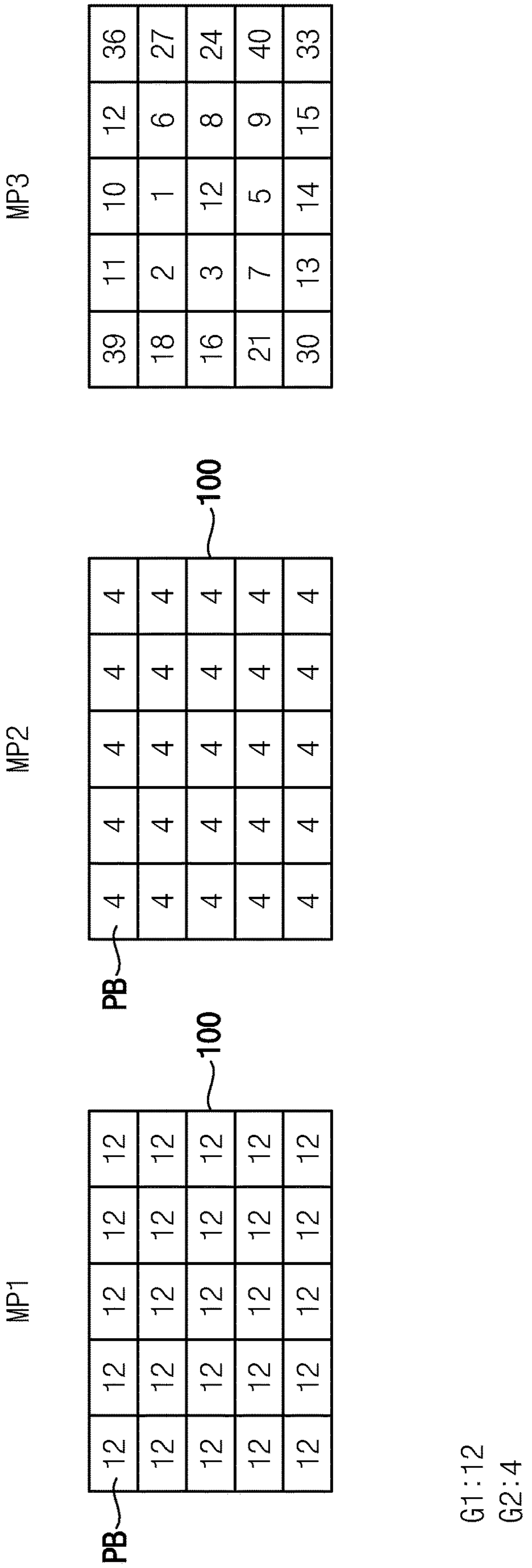
FIG. 5 is a conceptual diagram illustrating an example in which a position compensation value is determined according to the method of FIG. 4.
Figure 6:
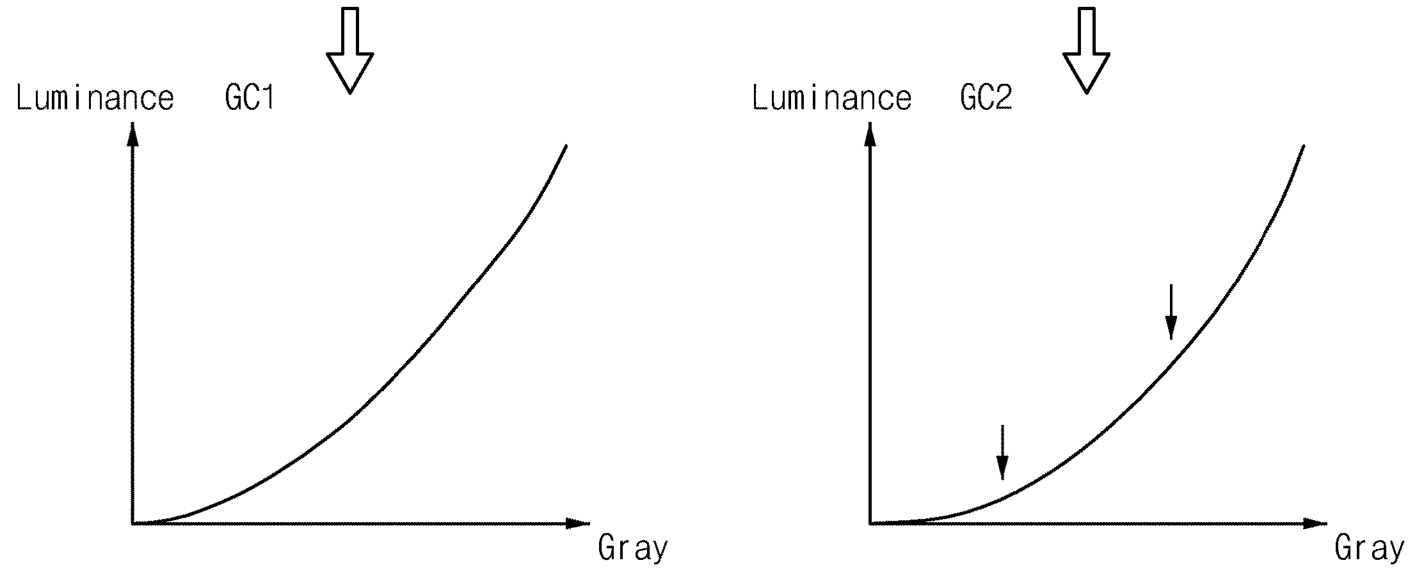
FIG. 6 is a conceptual diagram illustrating an example in which gamma curves are generated according to the method of FIG. 4.

FIG. 4 is a flowchart illustrating a method of compensating for luminance of a display device according to embodiments of the present inventive concept, FIG. 5 is a conceptual diagram illustrating an example in which a position compensation value is determined according to the method of FIG. 4, and FIG. 6 is a conceptual diagram illustrating an example in which gamma curves GC1 and GC2 are generated according to the method of FIG. 4.

Referring to FIGS. 1 to 6, the method of FIG. 4 may include determining the position compensation value of each of the panel blocks PB for measurement grayscale values based on a difference between luminance of the reference panel block RPB and luminance of the each of panel blocks PB for a same grayscale value (S100), generating a first gamma curve GC1 for a first driving frequency FR1 based on luminance of the panel blocks PB for the measurement grayscale values at the first driving frequency FR1 and the position compensation value of the each of panel blocks PB for the measurement grayscale values (S200), generating a second gamma curve GC2 for a second driving frequency FR2 different from the first driving frequency FR1 based on a difference between luminance of the panel blocks PB for the measurement grayscale values at the second driving frequency FR2 and the luminance of the panel blocks PB for the measurement grayscale values at the first driving frequency FR1 (S300), and compensating for the input image data IMG based on the first gamma curve GC1 and the second gamma curve GC2 (S400). The measurement grayscale values may be grayscale values displayed on the panel blocks PB in measurement periods MP1, MP2, MP3, and MP4.

Specifically, the method of FIG. 4 may include determining the position compensation value of each of the panel blocks PB for the measurement grayscale values based on the difference between luminance of the reference panel block RPB and luminance of the each of the panel blocks PB for the measurement grayscale values (S100).

For example, the method of FIG. 4 may display the first measurement gray scale value G1 to the panel blocks PB in a first measurement period MP1 of the first driving frequency FR1, display the second measurement grayscale value G2 to the panel blocks PB in a second measurement period MP2 of the first driving frequency FR1, display the first measurement grayscale value G1 to the reference panel block RPB and display grayscale values to the first panel blocks PB1 and the second panel blocks PB2, in a third measurement period MP3 of the first driving frequency FR1, and display the measurement grayscale values to the panel blocks PB in a same manner as in the third measurement period MP3, in a fourth measurement period MP4 of the second driving frequency FR2.

A first position compensation value of each of the panel blocks PB for the first measurement grayscale value G1 may be determined based on a difference between luminance of the reference panel block RPB for the first measurement grayscale value G1 and luminance of the panel blocks PB for the first measurement grayscale value G1. A second position compensation value of each of the panel blocks PB for the second measurement grayscale value may be determined based on a difference between luminance of the reference panel block RPB for the second measurement grayscale value G2 and luminance of the panel blocks PB for the second measurement grayscale value G2. The position compensation value of each of the panel blocks PB for other measurement grayscale values other than the first measurement grayscale value G1 and the second measurement grayscale value G2 among the measurement grayscale values may be determined based on the first position compensation value and the second position compensation value.

For example, it is assumed that the first measurement grayscale value G1 is a 12 grayscale value and the second measurement grayscale value G2 is a 4 grayscale value. The method of FIG. 4 may measure luminance of all panel blocks PB on which the 12 grayscale value is displayed and luminance of all panel blocks PB on which 4 grayscale value is displayed through the first measurement period MP1 and the second measurement period MP2. The first position compensation value of each of the panel blocks PB for the 12 grayscale value may be a difference between luminance of the reference panel block RPB on which the 12 grayscale value is displayed and luminance of all the panel blocks PB on which the 12 grayscale value is displayed. For example, when the luminance of the reference panel block RPB on which the 12 grayscale value is displayed is 2 nit and luminance of a specific panel block on which the 12 grayscale value is displayed is 1 nit, the position compensation value of the specific panel block for the 12 grayscale value may be 1 (2−1=1). For example, when the luminance of the reference panel block RPB on which a 4 grayscale value is displayed is 1 nit and luminance of a specific panel block on which the 4 grayscale value is displayed is 0.5 nit, the position compensation value of the specific panel block for the 4 grayscale value may be 0.5 (1−0.5=0.5). The position compensation value of each of the panel blocks PB for the first measurement grayscale value G1 and the second measurement grayscale value G2 may be determined by measuring luminance.

In an embodiment, the position compensation value of each of the panel blocks PB for the other measurement grayscale value may be determined by interpolating the position compensation value of each of the panel blocks PB for the first measurement grayscale value G1 and the position compensation value of each of the panel blocks PB for the second measurement grayscale value G2. For example, when the first measurement grayscale value G1 is the 12 grayscale value, the second measurement grayscale value G2 is the 4 grayscale value, the position compensation value of a specific panel block for the 12 grayscale value is 1, and the position compensation value of the specific panel block for the 4 grayscale value is 0.5, the position compensation value of the specific panel block for a 8 grayscale value may be 0.75. Accordingly, the position compensation value of each of the panel blocks PB for all the measurement grayscale values may be determined.

In another embodiment, The position compensation value of each of the panel blocks PB for the other measurement grayscale values may be calculated using Equation 1.

$$LC = C \times \left(\frac{G - G2}{G1 - G2}\right)^{u} \times (LC1 - LC2) + LC2, \quad \text{[Equation 1]}$$

where LC is the position compensation value of each of the panel blocks for the other measurement grayscale values, C is a first characteristic coefficient, G is the other measurement grayscale values, G1 is the first measurement grayscale value, G2 is the second measurement grayscale value, u is a second characteristic coefficient, LC1 is the first position compensation value, and LC2 is the second position compensation value. For example, when the first characteristic coefficient and the second characteristic coefficient are 1, the first measurement grayscale value G1 is the 12 grayscale value, the second measurement grayscale value G2 is the 4 grayscale value, the first position compensation value (the position compensation value of a specific panel block for the 12 grayscale value) is 1, and the second position compensation value (the position compensation value of the specific panel block for the 4 grayscale value) is 0.5, the position compensation value LC of the specific panel block for the 8 grayscale value may be 0.75. Accordingly, the position compensation value of each of the panel blocks PB for all the measurement grayscale values may be determined.

In an embodiment, the first characteristic coefficient C and the second characteristic coefficient u may be values calculated through artificial intelligence learning. For example, luminance may be measured while displaying various grayscale values on the panel blocks PB. The position compensation values for the other measurement grayscale values may be directly calculated through the measured luminance. The first characteristic coefficient C and the second characteristic coefficient u may be determined by repeatedly learning the artificial intelligence so that the directly calculated position compensation value is output as a result value.

Specifically, the method of FIG. 4 may include generating the first gamma curve GC1 for the first driving frequency FR1 based on luminance of the panel blocks PB for the measurement grayscale values at the first driving frequency FR1 and the position compensation value of each of the panel blocks PB for the measurement grayscale values (S200). For example, the first gamma curve GC1 may be generated by adding the position compensation value of each of the panel blocks PB for the measurement grayscale values to luminance of the panel blocks PB for the measurement grayscale values measured in the third measurement period MP3.

For example, when luminance for a 11 grayscale value measured in the third measurement period MP3 is 3 nit and the position compensation value of the panel block PB on which the 11 grayscale value is displayed in the third measurement period MP3 is 1, luminance according to the 11 grayscale value (x-axis) may be 4 nit (y-axis) in the first gamma curve GC1. As shown in FIG. 3, when the number of the panel blocks PB is 25, luminance according to 25 grayscale values is indicated on the first gamma curve GC1, and luminance according to the remaining grayscale values is measured by interpolation or the like. Accordingly, the first gamma curve GC1 may be generated.

Specifically, the method of FIG. 4 may include generating the second gamma curve GC2 for the second driving frequency FR2 different from the first driving frequency FR1 based on the difference between the luminance of the panel blocks PB for the measurement grayscale values at the second driving frequency FR2 and the luminance of the panel blocks PB for the measurement grayscale values at the first driving frequency FR1 (S300). Accordingly, the second gamma curve GC2 for the second driving frequency FR2 may be generated.

For example, the second gamma curve GC2 may be generated by adding the position compensation value of each of the panel blocks PB for the measurement grayscale values to the luminance of the panel blocks PB for the measurement grayscale values measured in the fourth measurement period MP4. The generating the second gamma curve GC2 is substantially the same as the generating the first gamma curve GC1 except that the second gamma curve GC2 is generated through the luminance of the panel blocks PB for the measurement grayscale values at the second driving frequency FR2. Thus, any repetitive explanation will be omitted.

In another example, the second gamma curve GC2 may be generated by changing the first gamma curve GC1 by a difference between luminance of the panel blocks PB for the measurement grayscale values measured in the fourth measurement period MP4 and luminance of the panel blocks PB for the measurement grayscale values measured in the third measurement period MP3.

Specifically, the method of FIG. 4 may include compensating for the input image data IMG based on the first gamma curve GC1 and the second gamma curve GC2 (S400). Gamma curves for frequencies other than the first driving frequency FR1 and the second driving frequency FR2 may be generated based on the first gamma curve GC1 and the second gamma curve GC2. For example, the gamma curves for the frequencies other than the first driving frequency FR1 and the second driving frequency FR2 may be generated by interpolating the first gamma curve GC1 and the second gamma curve GC2.

The input image data IMG may be compensated for by a difference between the first gamma curve GC1 and gamma curves other than the first gamma curve GC1. That is, the first gamma curve GC1 may be a reference gamma curve. In other words, the input image data IMG may be compensated so that a correlation between grayscale values and luminance at driving frequencies different from the first driving frequency FR1 becomes the same as that of the first gamma curve GC1. Accordingly, by compensating the input image data IMG according to the driving frequency, a difference in luminance according to the driving frequency may be compensated.

In an embodiment, the first driving frequency FR1 may be greater than the second driving frequency FR2. Accordingly, the second gamma curve GC2 may indicate lower luminance than the first gamma curve GC1 at the same grayscale value.

FIG. 7 is a conceptual diagram illustrating an example in which the position compensation value is determined according to a method of compensating for luminance of a display device according to embodiments of the present inventive concept.

The method according to the present embodiment is substantially the same as the method of FIG. 4 except for determining the position compensation value. Thus, the same reference numerals are used to refer to the same or similar element, and any repetitive explanation will be omitted.

Referring to FIGS. 1 to 3, 6, and 7, the method of FIG. 7 may include determining a position compensation value of each of the panel blocks PB for the measurement grayscale values based on the difference between luminance of the reference panel block RPB and luminance of the panel blocks PB for a same grayscale value.

For example, the method of FIG. 7 may display the third measurement gray scale value G3 to the reference panel block RPB, the first measurement grayscale value G1 to the first panel blocks PB1, and the third measurement grayscale value to the second panel blocks PB2 in the first measurement period MP1 of the first driving frequency FR1, display the second measurement grayscale value G2 to the reference panel blocks RPB and the first panel blocks PB1, and the first measurement grayscale value G1 to the second panel blocks PB2 in the second measurement period MP2 of the first driving frequency FR1, and display the first measurement grayscale value G1 to the reference panel block RPB, and the different measurement grayscale values to the first panel blocks PB1 and the second panel blocks PB2 in the third measurement period MP3 of the first driving frequency FR1. In an embodiment, the first measurement grayscale value G1 may be greater than the second measurement grayscale value G2 and may be smaller than the third measurement grayscale value G3.

A third position compensation value of each of the first panel blocks PB1 for the first measurement grayscale value G1 may be determined based on a difference between luminance of the reference panel block RPB for the first measurement grayscale value and luminance of the first panel blocks PB1 for the first measurement grayscale value. A fourth position compensation value of each of the second panel blocks PB2 for the first measurement grayscale value G1 may be determined based on a difference between the luminance of the reference panel block RPB for the first measurement grayscale value G1 and luminance of the second panel blocks PB2 for the first measurement grayscale value G1. A fifth position compensation value of each of the first panel blocks PB1 for the second measurement grayscale value G2 may be determined based on a difference between luminance of the reference panel block RPB for the second measurement grayscale value G2 and luminance of the first panel blocks PB1 for the second measurement grayscale value G2. A sixth position compensation value of each of the second panel blocks PB2 for the third measurement grayscale value G3 may be determined based on a difference between luminance of the reference panel block RPB for the third measurement grayscale value G3 and luminance of the second panel blocks PB2 for the third measurement grayscale value G3. A position compensation value of each of the first panel blocks PB1 for first other measurement grayscale values other than the first measurement grayscale value G1 and the second measurement grayscale value G2 among the measurement grayscale values may be determined based on the third position compensation value and the fifth position compensation value. A position compensation value of each of the second panel blocks PB2 for second other measurement grayscale values other than the first measurement grayscale value G1 and the third measurement grayscale value G3 among the measurement grayscale values may be determined based on the fourth position compensation value and the sixth position compensation value.

For example, it is assumed that the first measurement grayscale value G1 is the 12 grayscale value, the second measurement grayscale value G2 is the 4 grayscale value, and the third measurement grayscale value G3 is a 40 grayscale value. The method of FIG. 7 may measure luminance of all panel blocks PB on which the 12 grayscale value is displayed, luminance of all panel blocks PB on which 4 grayscale value is displayed, and luminance of all panel blocks PB on which the 40 grayscale value is displayed through the first measurement period MP1, the second measurement period MP2, and the third measurement period MP3. The first position compensation value of each of the panel blocks PB for the 12 grayscale value may be a difference between luminance of the reference panel block RPB on which the 12 grayscale value is displayed and luminance of each of the panel blocks PB on which the 12 grayscale value is displayed. For example, when the luminance of the reference panel block RPB on which the 12 grayscale value is displayed is 2 nit and luminance of a specific panel block on which the 12 grayscale value is displayed is 1 nit, the position compensation value of the specific panel block for the 12 grayscale value may be 1 (2−1=1). For example, when the luminance of the reference panel block RPB on which a 4 grayscale value is displayed is 1 nit and luminance of a specific panel block on which the 4 grayscale value is displayed is 0.5 nit, the position compensation value of the specific panel block for the 4 grayscale value may be 0.5 (1−0.5=0.5). For example, when the luminance of the reference panel block RPB on which a 40 grayscale value is displayed is 4 nit and luminance of a specific panel block on which the 40 grayscale value is displayed is 2.5 nit, the position compensation value of the specific panel block for the 40 gray scale value may be 1.5 (4−2.5=1.5). The position compensation value of each of the panel blocks PB for the first measurement grayscale value G1, the second measurement grayscale value G2, and the third measurement grayscale value G3 may be determined by measuring luminance.

In an embodiment, the position compensation value of each of the first panel blocks PB1 for the first other measurement grayscale values may be determined based on the third position compensation value (i.e., the position compensation value of each of the first panel blocks PB1 for the first measurement grayscale value G1) and the fifth position compensation value (i.e., the position compensation value of each of the first panel blocks PB1 for the second measurement grayscale value G2). Accordingly, a position compensation value of each of the first panel blocks PB1 for all grayscale values may be determined.

In another embodiment, the position compensation value of each of the first panel blocks PB1 for the first other measurement grayscale values may be determined by using Equation 2.

$$LCA = C\times\left(\frac{G-G2}{G1-G2}\right)^{u}\times(LC3-LC5)+LC5, \qquad \text{[Equation 2]}$$

where LCA is the position compensation value of each of the first panel blocks PB1 for the first other measurement grayscale values, C is the first characteristic coefficient, G is the first other measurement grayscale values, G1 is the first measurement grayscale value, G2 is the second measurement grayscale, u is the second characteristic coefficient, LC3 is the third position compensation value, and LC5 is the fifth position compensation value. For example, when the first characteristic coefficient and the second characteristic coefficient are 1, the first measurement grayscale value G1 is the 12 grayscale value, the second measurement grayscale value G2 is the 4 grayscale value, the third position compensation value of a specific first panel block is 1, and the fifth position compensation value of the specific first panel block is 0.5, the position compensation value of the specific first panel block for the 8 grayscale value may be 0.75. Accordingly, a position compensation value of each of the first panel blocks PB1 for all grayscale values may be determined.

In an embodiment, the first characteristic coefficient C and the second characteristic coefficient u may be values calculated through artificial intelligence learning. For example, luminance may be measured while displaying various grayscale values on the panel blocks PB. The position compensation values for the first other measurement grayscale values may be directly calculated through the measured luminance. The first characteristic coefficient C and the second characteristic coefficient u may be determined by repeatedly learning the artificial intelligence so that the directly calculated position compensation value is output as a result value.

In an embodiment, the position compensation value of each of the second panel blocks PB2 for the second other measurement grayscale values may be determined based on the fourth position compensation value (i.e., the position compensation value of each of the second panel blocks PB2 for the first measurement grayscale value G1) and the sixth position compensation value (i.e., the position compensation value of each of the second panel blocks PB2 for the third measurement grayscale value G3). For example, when the first measurement grayscale value G1 is the 12 grayscale value, the third measurement grayscale value G3 is the 40 grayscale value, the fourth position compensation value of a specific first panel block is 0.5, and the sixth position compensation value of the specific first panel block is 1, the position compensation value of the specific first panel block for a 26 grayscale value may be 0.75. Accordingly, a position compensation value of each of the second panel blocks PB2 for all grayscale values may be determined.

In another embodiment, the position compensation value of each of the second panel blocks PB2 for the second other measurement grayscale values may be determined by using Equation 3.

$$LCB = C \times \left(\frac{G - G1}{G3 - G1}\right)^{u} \times (LC5 - LC4) + LC4, \quad \text{[Equation 3]}$$

where LCB is the position compensation value of each of the second panel blocks PB2 for the second other measurement grayscale values, C is the first characteristic coefficient, G is the second other measurement grayscale values, G1 is the first measurement grayscale value, G3 is the third measurement grayscale value, u is the second characteristic coefficient, LC6 is the sixth position compensation value, and LC4 is the fourth position compensation value. For example, when the first characteristic coefficient C and the second characteristic coefficient u are 1, the first measurement grayscale value G1 is the 12 grayscale value, the third measurement grayscale value G3 is the 40 grayscale value, the fourth position compensation value of a specific second panel block is 0.5, and the sixth position compensation value of the specific second panel block is 1, the position compensation value of the specific second panel block for the 26 grayscale value may be 0.75. Accordingly, a position compensation value of each of the second panel blocks PB2 for all grayscale values may be determined.

In an embodiment, the first characteristic coefficient C and the second characteristic coefficient u may be values calculated through artificial intelligence learning. For example, luminance may be measured while displaying various grayscale values on the panel blocks PB. The position compensation values for the second other measurement grayscale values may be directly calculated through the measured luminance. The first characteristic coefficient C and the second characteristic coefficient u may be determined by repeatedly learning the artificial intelligence so that the directly calculated position compensation value is output as a result value.

In an embodiment, the measurement grayscale values displayed on the first panel blocks PB1 may be smaller than the measurement grayscale values displayed on the second panel blocks PB2 in the third measurement period MP3. The first measurement grayscale value G1 may be greater than the second measurement grayscale value G2 and may be smaller than the third measurement grayscale value G3. Accordingly, the position compensation value of each of the first panel blocks PB1 on which grayscale values smaller than grayscale values displayed on the second panel blocks PB2 are displayed may be determined based on the position compensation value for the first measurement value G1 and the second measurement value G2 smaller than the third measurement value G3, and the position compensation value of each of the second panel blocks PB2 may be determined based on the position compensation value for the second measurement value G2 and the third measurement value G3.

Figure 8:
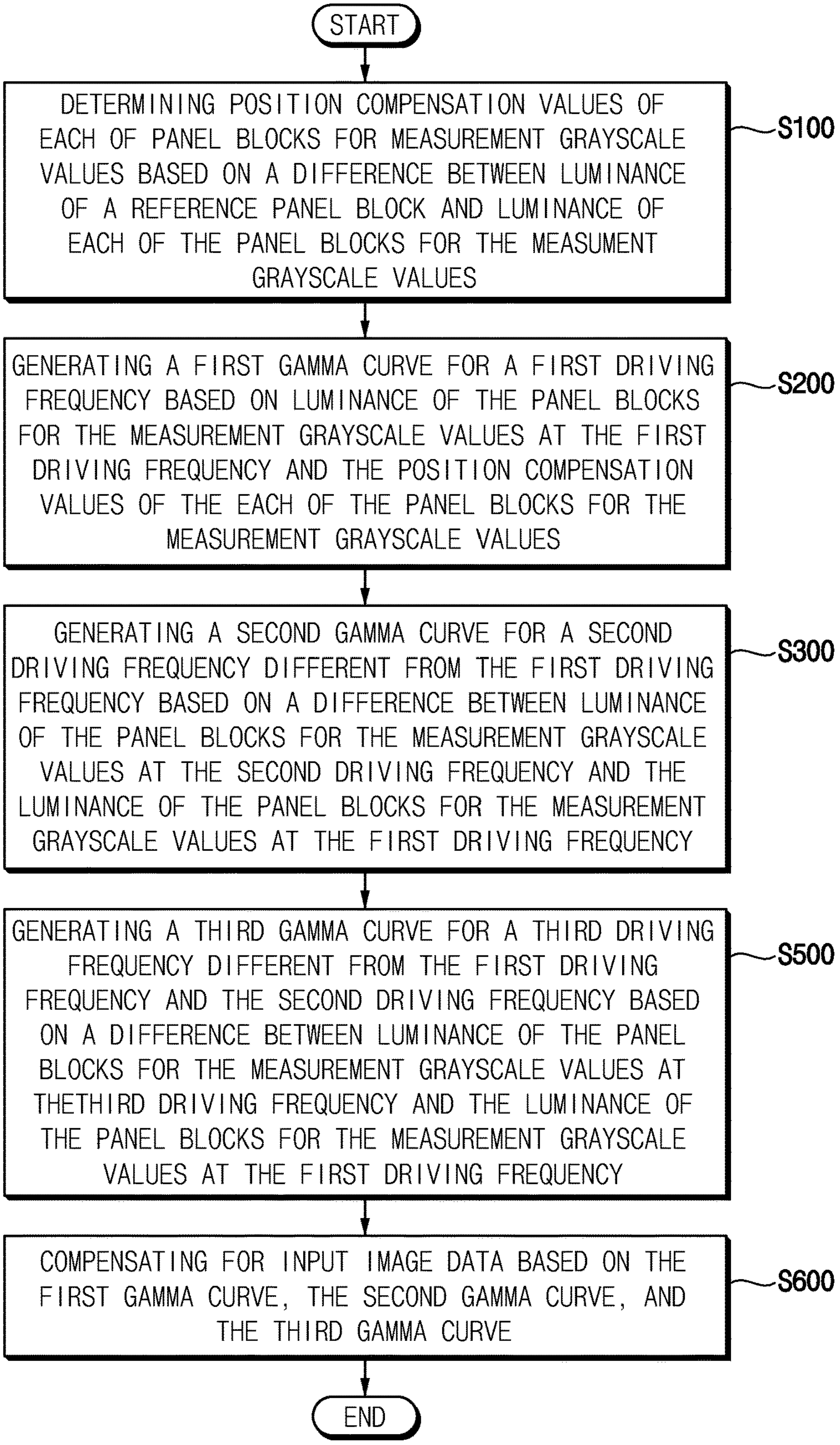
FIG. 8 is a flowchart illustrating a method of compensating for luminance of a display device according to embodiments of the present inventive concept.
Figure 9:
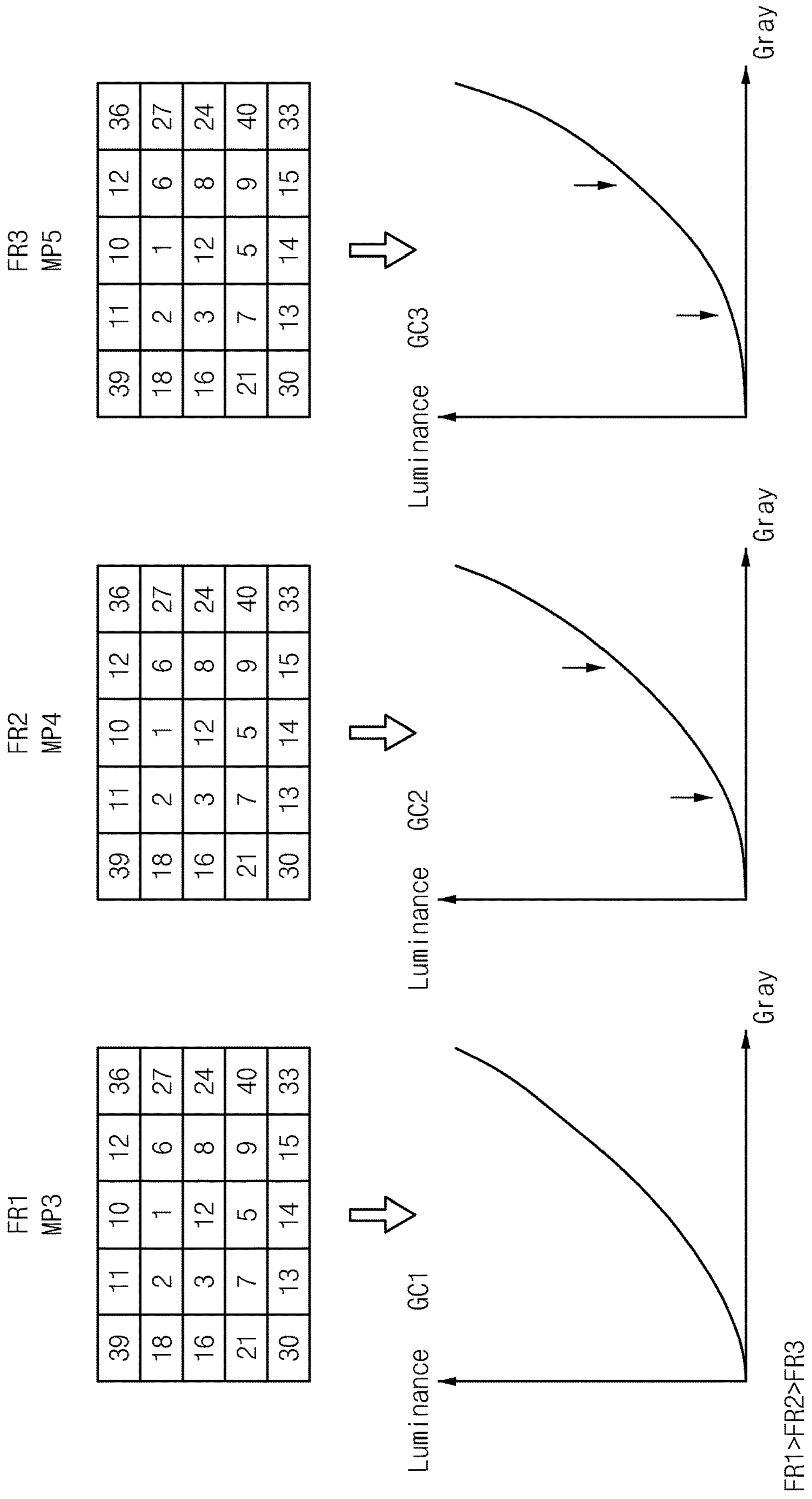
FIG. 9 is a conceptual diagram illustrating an example in which gamma curves are generated according to the method of FIG. 8.

FIG. 8 is a flowchart illustrating a method of compensating for luminance of a display device according to embodiments of the present inventive concept, and FIG. 9 is a conceptual diagram illustrating an example in which gamma curves GC1, GC2, and GC3 are generated according to the method of FIG. 8.

The method according to the present embodiment is substantially the same as the method of FIG. 7 except for generating the gamma curves GC1, GC2, and GC3. Thus, the same reference numerals are used to refer to the same or similar element, and any repetitive explanation will be omitted.

Referring to FIGS. 1 to 3, 8, and 9, the method of FIG. 8 may include determining the position compensation value of each of the panel blocks PB for measurement grayscale values based on a difference between luminance of the reference panel block RPB and luminance of the each of the panel blocks PB for a same grayscale value (S100), generating a first gamma curve GC1 for a first driving frequency FR1 based on the luminance of the panel blocks PB for the measurement grayscale values at the first driving frequency FR1 and the position compensation value of each of the panel blocks PB for the measurement grayscale values (S200), generating a second gamma curve GC2 for a second driving frequency FR2 different from the first driving frequency FR1 based on a difference between luminance of the panel blocks PB for the measurement grayscale values at the second driving frequency FR2 and the luminance of the panel blocks PB for the measurement grayscale values at the first driving frequency FR1 (S300), generating a third gamma curve GC3 for a third driving frequency FR3 different from the first driving frequency FR1 and the second driving frequency FR2 based on a difference between luminance of the panel blocks PB for the measurement grayscale values at the third driving frequency FR3 and the luminance of the panel blocks PB for the measurement grayscale values at the first driving frequency FR1 (S500), and compensating for the input image data IMG based on the first gamma curve GC1, the second gamma curve GC2, and the third gamma curve GC3 (S600).

For example, the method of FIG. 8 may display the first measurement gray scale value G1 to the panel blocks PB in the first measurement period MP1 of the first driving frequency FR1, display the second measurement grayscale value G2 to the panel blocks PB in the second measurement period MP2 of the first driving frequency FR1, display the first measurement grayscale value G1 to the reference panel block RPB and the different measurement grayscale values to the first panel blocks PB1 and the second panel blocks PB2 in the third measurement period MP3 of the first driving frequency FR1, display the measurement grayscale values to the panel blocks PB in a same manner as in the third measurement period MP3 in the fourth measurement period MP4 of the second driving frequency FR2, and display the measurement grayscale values to the panel blocks PB in a same manner as in the third measurement period MP3 in a fifth measurement period MP5 of the third driving frequency FR3.

Specifically, the method of FIG. 8 may include generating the first gamma curve GC1 for the first driving frequency FR1 based on luminance of the panel blocks PB for the measurement grayscale values at the first driving frequency FR1 and the position compensation value of each of the panel blocks PB for the measurement grayscale values (S200). For example, the first gamma curve GC1 may be generated by adding the position compensation value of each of the panel blocks PB for the measurement grayscale values to luminance of the panel blocks PB for the measurement grayscale values measured in the third measurement period MP3.

For example, when luminance for the 11 grayscale value measured in the third measurement period MP3 is 3 nit and the position compensation value of the panel block PB on which the 11 grayscale value is displayed in the third measurement period MP3 is 1, luminance according to the 11 grayscale value (x-axis) may be 4 nit (y-axis) in the first gamma curve GC1. As shown in FIG. 3, when the number of the panel blocks PB is 25, luminance according to 25 grayscale values is indicated on the first gamma curve GC1, and luminance according to the remaining grayscale values is measured by interpolation or the like. Accordingly, the first gamma curve GC1 may be generated.

Specifically, the method of FIG. 8 may include generating the second gamma curve GC2 for the second driving frequency FR2 different from the first driving frequency FR1 based on the difference between the luminance of the panel blocks PB for the measurement grayscale values at the second driving frequency FR2 and the luminance of the panel blocks PB for the measurement grayscale values at the first driving frequency FR1 (S300). Accordingly, the second gamma curve GC2 for the second driving frequency FR2 may be generated.

For example, the second gamma curve GC2 may be generated by adding the position compensation value of each of the panel blocks PB for the measurement grayscale values to the luminance of the panel blocks PB for the measurement grayscale values measured in the fourth measurement period MP4. The generating the second gamma curve GC2 is substantially the same as the generating the first gamma curve GC1 except that the second gamma curve GC2 is generated through the luminance of the panel blocks PB for the measurement grayscale values at the second driving frequency FR2. Thus, any repetitive explanation will be omitted.

In another example, the second gamma curve GC2 may be generated by changing the first gamma curve GC1 by a difference between luminance of the panel blocks PB for the measurement grayscale values measured in the fourth measurement period MP4 and luminance of the panel blocks PB for the measurement grayscale values measured in the third measurement period MP3.

Specifically, the method of FIG. 8 may include generating the third gamma curve GC3 for the third driving frequency FR3 different from the first driving frequency FR1 and the second driving frequency FR2 based on a difference between luminance of the panel blocks PB for the measurement grayscale values at the third driving frequency FR3 and the luminance of the panel blocks PB for the measurement grayscale values at the first driving frequency FR1 (S500). Accordingly, the third gamma curve GC3 for the second driving frequency FR2 may be generated.

For example, the third gamma curve GC3 may be generated by adding the position compensation value of each of the panel blocks PB for the measurement grayscale values to the luminance of the panel blocks PB for the measurement grayscale values measured in the fifth measurement period MP5. The generating the third gamma curve GC3 is substantially the same as the generating the first gamma curve GC1 except that the third gamma curve GC3 is generated through the luminance of the panel blocks PB for the measurement grayscale values at the third driving frequency FR3. Thus, any repetitive explanation will be omitted.

In another example, the third gamma curve GC3 may be generated by changing the first gamma curve GC1 by a difference between luminance of the panel blocks PB for the measurement grayscale values measured in the fifth measurement period MP5 and luminance of the panel blocks PB for the measurement grayscale values measured in the third measurement period MP3.

Specifically, the method of FIG. 8 may include compensating for the input image data IMG based on the first gamma curve GC1, the second gamma curve GC2, and the third gamma curve GC3 (S600). Gamma curves for frequencies other than the first driving frequency FR1, the second driving frequency FR2, and the third driving frequency FR3 may be generated based on the first gamma curve GC1, the second gamma curve GC2, and the third gamma curve GC3. For example, the gamma curves for the frequencies other than the first driving frequency FR1, the second driving frequency FR2, and the third driving frequency FR3 may be generated by interpolating the first gamma curve GC1, the second gamma curve GC2, and the third gamma curve GC3. The method of FIG. 8 may generate the gamma curves other than the first driving frequency FR1, the second driving frequency FR2, and the third driving frequency FR3 based on the gamma curves GC1, GC2, and GC3 for the first driving frequency FR1, the second driving frequency FR2, and the third driving frequency FR3, but the method is not limited thereto. For example, the method of FIG. 8 may generate gamma curves for different frequencies based on gamma curves for four or more driving frequencies.

The input image data IMG may be compensated for by a difference between the first gamma curve GC1 and gamma curves other than the first gamma curve GC1. That is, the first gamma curve GC1 may be a reference gamma curve. In other words, the input image data IMG may be compensated so that a correlation between grayscale values and luminance at driving frequencies different from the first driving frequency FR1 becomes the same as that of the first gamma curve GC1. Accordingly, by compensating the input image data IMG according to the driving frequency, a difference in luminance according to the driving frequency may be compensated.

In an embodiment, the first driving frequency FR1 may be greater than the second driving frequency FR2 and the third driving frequency FR3. Accordingly, the second gamma curve GC2 and the third gamma curve GC3 may indicate lower luminance than the first gamma curve GC1 at the same grayscale value.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A method of compensating for luminance of a display device comprising:

determining position compensation values of each of panel blocks for measurement grayscale values based on a difference between luminance of a reference panel block and luminance of the each of the panel blocks for the measurement grayscale values;

generating a first gamma curve for a first driving frequency based on luminance of the panel blocks for the measurement grayscale values at the first driving frequency and the position compensation values of the each of the panel blocks for the measurement grayscale values;

generating a second gamma curve for a second driving frequency different from the first driving frequency based on a difference between luminance of the panel blocks for the measurement grayscale values at the second driving frequency and the luminance of the panel blocks for the measurement grayscale values at the first driving frequency; and compensating for input image data based on the first gamma curve and the second gamma curve.

2. The method of claim 1, wherein determining the position compensation values of the each of the panel blocks comprises:

determining a first position compensation value of each of the panel blocks for a first measurement grayscale value based on a difference between luminance of the reference panel block for the first measurement grayscale value and luminance of the each of the panel blocks for the first measurement grayscale value;

determining a second position compensation value of each of the panel blocks for the second measurement grayscale value based on a difference between luminance of the reference panel block for the second measurement grayscale value and luminance of the each of the panel blocks for the second measurement grayscale value; and determining the position compensation value of each of the panel blocks for other measurement grayscale values other than the first measurement grayscale value and the second measurement grayscale value among the measurement grayscale values based on the first position compensation value and the second position compensation value.

3. The method of claim 2, wherein the position compensation value of each of the panel blocks for the other measurement grayscale values is determined by using $$LC = C\times\left(\frac{G-G2}{G1-G2}\right)^{u}\times(LC1-LC2)+LC2,$$

where LC is the position compensation value of the each of the panel blocks for the other measurement grayscale values, C is a first characteristic coefficient, G is the other measurement grayscale values, G1 is the first measurement grayscale value, G2 is the second measurement grayscale value, u is a second characteristic coefficient, LC1 is the first position compensation value, and LC2 is the second position compensation value.

4. The method of claim 1, wherein the determining the position compensation value of the each of the panel blocks comprises:

determining a third position compensation value of each of first panel blocks for a first measurement grayscale value based on a difference between luminance of the reference panel block for the first measurement grayscale value and luminance of the each of the first panel blocks for the first measurement grayscale value;

determining a fourth position compensation value of each of second panel blocks for the first measurement grayscale value based on a difference between the luminance of the reference panel block for the first measurement grayscale value and luminance of the each of the second panel blocks for the first measurement grayscale value;

determining a fifth position compensation value of each of the first panel blocks for a second measurement grayscale value based on a difference between luminance of the reference panel block for the second measurement grayscale value and luminance of the each of the first panel blocks for the second measurement grayscale value;

determining a sixth position compensation value of each of the second panel blocks for third measurement grayscale value based on a difference between luminance of the reference panel block for the third measurement grayscale value and luminance of the each of the second panel blocks for the third measurement grayscale value;

determining position compensation values of each of the first panel blocks for first other measurement grayscale values other than the first measurement grayscale value and the second measurement grayscale value among the measurement grayscale values based on the third position compensation value and the fifth position compensation value; and determining position compensation values of each of the second panel blocks for second other measurement grayscale values other than the first measurement grayscale value and the third measurement grayscale value among the measurement grayscale values based on the fourth position compensation value and the sixth position compensation value.

5. The method of claim 4, wherein the position compensation value of the each of the first panel blocks for the first other measurement grayscale values is determined by using $$LCA = C\times\left(\frac{G-G2}{G1-G2}\right)^{u}\times(LC3-LC5)+LC5,$$

where LCA is the position compensation value of the each of the first panel blocks for the first other measurement grayscale values, C is a first characteristic coefficient, G is the first other measurement grayscale values, G1 is the first measurement grayscale value, G2 is the second measurement grayscale, u is a second characteristic coefficient, LC3 is the third position compensation value, and LC5 is the fifth position compensation value, and wherein the position compensation value of the each of the second panel blocks for the second other measurement grayscale values is determined by using $$LCB = C\times\left(\frac{G-G1}{G3-G1}\right)^{u}\times(LC5-LC4)+LC4,$$

where LCB is the position compensation value of the each of the second panel blocks for the second other measurement grayscale values, C is the first characteristic coefficient, G is the second other measurement grayscale values, G1 is the first measurement grayscale value, G3 is the third measurement grayscale value, u is the second characteristic coefficient, LC6 is the sixth position compensation value, and LC4 is the fourth position compensation value.

6. The method of claim 5, wherein the first characteristic coefficient and the second characteristic coefficient are calculated through artificial intelligence learning.

7. The method of claim 4, wherein determining the position compensation value of the each of the panel blocks comprises:

displaying the third measurement grayscale value to the reference panel block, the first measurement grayscale value to the first panel blocks, and the third measurement grayscale value to the second panel blocks in a first measurement period of the first driving frequency;

displaying the second measurement grayscale value to the first panel blocks and the first measurement grayscale value to the second panel blocks in a second measurement period of the first driving frequency; and displaying the first measurement grayscale value to the reference panel block, and the different measurement grayscale values to the first panel blocks and the second panel blocks in a third measurement period of the first driving frequency.

8. The method of claim 7, wherein the first gamma curve is generated by adding the position compensation value of each of the panel blocks for the measurement grayscale values to luminance of the panel blocks for the measurement grayscale values measured in the third measurement period.

9. The method of claim 8, wherein generating the second gamma curve comprises:

displaying the measurement grayscale values to the panel blocks in a same manner as in the third measurement period in a fourth measurement period of the second driving frequency; and generating the second gamma curve by adding the position compensation value of each of the panel blocks for the measurement grayscale values to luminance of the panel blocks for the measurement grayscale values measured in the fourth measurement period.

10. The method of claim 7, wherein the first measurement grayscale is greater than the second measurement grayscale and is smaller than the third measurement grayscale, wherein the first panel blocks are disposed to surround the reference panel blocks, and wherein the second panel blocks are disposed to surround the first panel blocks.

11. The method of claim 7, wherein the measurement grayscale values displayed on the first panel blocks are smaller than the measurement grayscale values displayed on the second panel blocks in the third measurement period.

12. The method of claim 1, wherein the compensating for the input image data comprises:

generating gamma curves for frequencies other than the first driving frequency and the second driving frequency based on the first gamma curve and the second gamma curve; and compensating for the input image data by a difference between the first gamma curve and gamma curves other than the first gamma curve.

13. The method of claim 12, wherein the first driving frequency is greater than the second driving frequency.

14. A method of compensating for luminance of a display device comprising:

determining position compensation values of each of panel blocks for measurement grayscale values based on a difference between luminance of a reference panel block and luminance of the each of the panel blocks for the measurement gray scale values;

generating a first gamma curve for a first driving frequency based on luminance of the panel blocks for the measurement grayscale values at the first driving frequency and the position compensation values of the each of the panel blocks for the measurement grayscale values;

generating a second gamma curve for a second driving frequency different from the first driving frequency based on a difference between luminance of the panel blocks for the measurement grayscale values at the second driving frequency and the luminance of the panel blocks for the measurement grayscale values at the first driving frequency;

generating a third gamma curve for a third driving frequency different from the first driving frequency and the second driving frequency based on a difference between luminance of the panel blocks for the measurement grayscale values at the third driving frequency and the luminance of the panel blocks for the measurement grayscale values at the first driving frequency; and compensating for input image data based on the first gamma curve, the second gamma curve, and the third gamma curve.

15. The method of claim 14, wherein the determining the position compensation values of the each of the panel blocks comprises:

determining a third position compensation value of each of first panel blocks for a first measurement grayscale value based on a difference between luminance of the reference panel block for the first measurement grayscale value and luminance of the each of the first panel blocks for the first measurement grayscale value;

determining a fourth position compensation value of each of second panel blocks for the first measurement grayscale value based on a difference between the luminance of the reference panel block for the first measurement grayscale value and luminance of the each of the second panel blocks for the first measurement grayscale value;

determining a fifth position compensation value of each of the first panel blocks for a second measurement grayscale value based on a difference between luminance of the reference panel block for the second measurement grayscale value and luminance of the each of the first panel blocks for the second measurement grayscale value;

determining a sixth position compensation value of each of the second panel blocks for a third measurement grayscale value based on a difference between luminance of the reference panel block for the third measurement grayscale value and luminance of the each of the second panel blocks for the third measurement grayscale value;

determining position compensation values of each of the first panel blocks for first other measurement grayscale values other than the first measurement grayscale value and the second measurement grayscale value among the measurement grayscale values based on the third position compensation value and the fifth position compensation value; and determining position compensation values of each of the second panel blocks for second other measurement grayscale values other than the first measurement grayscale value and the third measurement grayscale value among the measurement grayscale values based on the fourth position compensation value and the sixth position compensation value.

16. The method of claim 15, wherein the determining the position compensation values of each of the panel blocks comprises:

displaying the third measurement grayscale value to the reference panel block, the first measurement grayscale value to the first panel blocks, and the third measurement grayscale value to the second panel blocks in a first measurement period of the first driving frequency;

displaying the second measurement grayscale value to the first panel blocks and the first measurement grayscale value to the second panel blocks in a second measurement period of the first driving frequency; and displaying the first measurement grayscale value to the reference panel block and the different measurement grayscale values to the first panel blocks and the second panel blocks in a third measurement period of the first driving frequency.

17. The method of claim 16, wherein the first gamma curve is generated by adding the position compensation values of each of the panel blocks for the measurement grayscale values to luminance of the panel blocks for the measurement grayscale values measured in the third measurement period.

18. The method of claim 17, wherein the generating the second gamma curve comprises:

displaying the same measurement grayscale values as the third measurement period to the panel blocks in a fourth measurement period of the second driving frequency; and generating the second gamma curve by adding the position compensation values of each of the panel blocks for the measurement grayscale values to luminance of the panel blocks for the measurement grayscale values measured in the fourth measurement period, and wherein the generating the third gamma curve comprises:

displaying the same measurement grayscale values as the third measurement period to the panel blocks in a fifth measurement period of the third driving frequency; and generating the third gamma curve by adding the position compensation values of each of the panel blocks for the measurement grayscale values to luminance of the panel blocks for the measurement grayscale values measured in the fifth measurement period.

19. The method of claim 14, wherein the compensating for the input image data comprises:

generating gamma curves for frequencies other than the first driving frequency, the second driving frequency, and the third driving frequency based on the first gamma curve, the second gamma curve, and the third gamma curve; and compensating for the input image data by a difference between the first gamma curve and gamma curves other than the first gamma curve.

20. The method of claim 19, wherein the first driving frequency is greater than the second driving frequency and the third driving frequency.

* * * * *